(12) United States Patent
Clarke

(10) Patent No.: US 8,444,357 B2
(45) Date of Patent: May 21, 2013

(54) PROVIDING A COUNTER TORQUE FORCE WITHIN A FASTENING

(76) Inventor: Ronald C. Clarke, Phoenix, AZ (US)

( * ) Notice: Subject to any disclaimer, the term of this patent is extended or adjusted under 35 U.S.C. 154(b) by 494 days.

(21) Appl. No.: 12/774,563

(22) Filed: May 5, 2010

(65) Prior Publication Data

US 2010/0284765 A1    Nov. 11, 2010

Related U.S. Application Data

(60) Provisional application No. 61/175,628, filed on May 5, 2009.

(51) Int. Cl.
*F16B 39/24* (2006.01)

(52) U.S. Cl.
USPC ........... 411/162; 411/132; 411/158; 411/160; 411/533

(58) Field of Classification Search
USPC ................. 411/131, 132, 154, 158, 160, 162, 411/534, 545, 533
See application file for complete search history.

(56) References Cited

U.S. PATENT DOCUMENTS

| | | | | |
|---|---|---|---|---|
| 676,939 A | * | 6/1901 | Eveland | 384/609 |
| 1,034,697 A | * | 8/1912 | Darling | 411/162 |
| 1,368,473 A | * | 2/1921 | Beatty | 411/534 |
| 1,928,182 A | * | 9/1933 | Mahoney | 411/534 |
| 2,034,258 A | * | 3/1936 | Hausser | 411/162 |
| 2,069,402 A | * | 2/1937 | Cowlin | 411/154 |
| 2,179,575 A | * | 11/1939 | Hosking | 411/162 |
| 2,274,010 A | * | 2/1942 | Stellin | 411/161 |
| 3,481,381 A | * | 12/1969 | Black | 411/162 |
| 6,036,422 A | * | 3/2000 | Postma et al. | 411/534 |
| 6,287,063 B1 | * | 9/2001 | Moller | 411/163 |
| 2003/0031526 A1 | | 2/2003 | Grant | |
| 2004/0086354 A1 | | 5/2004 | Harris | |
| 2004/0234358 A1 | | 11/2004 | Genick | |
| 2007/0248434 A1 | * | 10/2007 | Wiley et al. | 411/160 |
| 2009/0103998 A1 | | 4/2009 | Gagneur | |

OTHER PUBLICATIONS

International Search Report and Written Opinion dated Jan. 24, 2011 for Application No. PCT/US2010/033763 (8 pages).

* cited by examiner

*Primary Examiner* — Roberta Delisle
(74) *Attorney, Agent, or Firm* — Craig Steven Jepson

(57) ABSTRACT

A washer body bearing hardened balls in apertures in the washer body provides a counter-torque resistance in a fastening. The hardened balls form projections that indent the underside of a fastener head and an adjacent fastening joint surface during tightening of the fastening to prevent rotation of the fastener head while a nut is driven to tighten or loosen the fastening. A reservoir portion of the apertures in the washer around the balls receives the material displaced during indention to allow full contact of the washer with the fastener head and joint surface. The hardened balls provide point loads for ready indentation upon minimal loading to prevent rotation of the fastener, obviating the need for a counter-torque wrench.

17 Claims, 6 Drawing Sheets

PROVIDING A COUNTER TORQUE FORCE WITHIN A FASTENING

CROSS-REFERENCE TO RELATED APPLICATION(S)

The present application claims the benefit of U.S. Provisional Application No. 61/175,628, filed May 5, 2009, which is incorporated herein in its entirety by reference.

BACKGROUND

1. Field of the Invention

This invention relates to locking mechanical fastenings, and more particularly to lock washers.

2. Description of the Related Art

With reference to FIG. 1, a traditional nut and bolt fastening 1 includes a threaded fastener 3 inserted through an opening in a fixed joint surface 5 and complementary nut 7 threaded onto threaded fastener 3. Fastening 1 is typically tightened using a tightening tool, such as a wrench 9 or impact driver on the nut or fastener head while a counter-torque tool such as a second wrench 11 is used to prevent rotation of the non-driven one of the nut and fastener. Thus, such traditional fastenings generally require two tools and in some cases two mechanics to properly tighten or loosen fastening 1.

In large-scale industrial fastenings, tooling and torque requirements often mandate cooperation of two mechanics in difficult or dangerous situations, for example, in elevated or cramped installations. Accordingly, improvements in the ease, efficiency and safety of forming industrial fastenings are sought.

SUMMARY

It has been discovered that a counter-torque force may be provided during formation of a fastening using a counter-torque washer including a washer body having two oppositely-directed broad sides and defining a central aperture therethrough for receiving a threaded fastener; and multiple hardened balls retained against rotation within respective apertures through the washer body. Each of the balls is sized such that it extends beyond both of the oppositely-directed broad sides of the washer body to engage adjacent surfaces between which the counter-torque washer is compressed during tightening or loading of a threaded fastener disposed within the central aperture.

In some implementations, the counter-torque washer is positioned adjacent a head of the threaded fastener such that the balls indent the underside of the fastener head.

In some implementation, the balls are press-fitted into the apertures.

A small annular space around the balls in their respective apertures provides a relief volume or reservoir that accommodates the material displaced from indentation to allow the washer to remain in full-faced contact with the fastener head and a fastening joint surface to allow the washer to fully spread the applied load. The relief volume is preferably at least equal to a volume of a portion of the respective ball that extends beyond the broad side of the washer. While the space needs not be annular, such a configuration can provide for receipt of displaced materials in multiple radial directions substantially within the plane of the broad surface. Sufficiency of relief volume ensures that displaced material from indenting does not encroach beyond the annular space or prevent the broad side of the washer from fully engaging a respective fastening surface.

In some implementations, a counter-torque washer includes a washer body having two broadest sides and defining a through-hole for receiving a fastener. A plurality of hardened spheres are seated in apertures in the washer body and extend beyond the two broadest sides of the washer body to provide hardened projections for indenting the fastener head and an adjacent joint surface in a fastening to substantially prevent rotation of the fastener head during tightening or loosening of the fastening.

In some implementations, the projections are hardened ball bearing balls and the projections are substantially hemispherical. In alternative implementations, suitable projections may be provided by non-spherical hardened components. In some cases, hardened spheres are advantageous as presenting a point load for initial indenting with uniform displacement of material upon further indenting. Additionally, hardened spheres are readily available and may be secured within the washer body without regard to orientation. These and additional benefits may be provided by hardened spheres, yet other hardened projections on non-spherical components may provide suitable indentation in some cases. For example, hemispherical projections may be provided at opposite ends of a cylindrical component extending through the washer, or may be embedded in recesses on opposite broad washer surfaces.

In some cases, the projections are of a hardness that is substantially greater than a hardness of the washer body and/or adjacent surfaces in the fastening to be formed. Thus, the projections are configured to indent the underside of a head of a fastener inserted through the washer (or a nut threaded onto a fastener, as the case may be) and the underlying joint surface during tightening of the fastener to prevent rotating of the fastener head.

In some implementations, multiple spaced-apart projections are configured to indent an adjacent surface in a fastening to provide a counter-torque force during both tightening and loosening of the fastener. In a particular implementation, three projections are substantially equally circumferentially spaced around the washer body.

In some implementations, an empty portion of the aperture in which the ball is retained is configured as a relief volume or reservoir to receive material displaced by the ball during indentation.

In some applications, the invention features a method of securing components together with a threaded fastener, e.g., a bolt or threaded rod. The threaded fastener includes a head presenting an undersurface and a shaft extending from the head. In the case of a threaded rod, a nut or nut and washer combination may provide a similar undersurface. The method includes inserting the fastener shaft through a counter-torque washer including a washer body having two oppositely-directed broad sides and defining a central aperture therethrough for receiving a threaded fastener; and multiple hardened balls retained against rotation within respective apertures through the washer body. The threaded fastener is further inserted through a respective aperture(s) defined in a component(s) to be fastened and into a threaded nut, or other suitable threaded hole. The method further includes tightening the threaded nut on the fastener such that both the undersurface of the head of the threaded fastener and a surface of the component to be fastened, bear against the hardened balls of the counter-torque washer with sufficient load that the hardened balls indent either one or both of the undersurface of the fastener and the surface of the component.

In some applications, indentation of the balls into surfaces of either one or both of the threaded fastener head and the fastened component serves to prevent rotation of the threaded fastener head during tightening and loosening of the fastening. In particular, the washer substantially prevents rotation of a threaded fastener during rotation of a nut threaded onto the fastener. This effectively reduces, if not eliminates, the need for a second wrench or second mechanic to provide a counter-torque force during tightening and loosening of a fastening.

In some applications, a method of forming a fastening includes providing a washer body for use with a threaded fastener and a nut configured to threadably engage the threaded fastener. The washer body defines a through-hole for receiving the threaded fastener therethrough and has two broadest sides, the broadest sides of the washer body presenting a plurality of hardened projections immovably seated in apertures in the broadest sides. The method includes positioning the washer body adjacent an underside of a head of the threaded fastener and rotating the nut to threadably tighten the fastening. As the fastening is tightened during the rotating, the hardened projections indent the underside of the fastener head and an adjacent fastening surface to substantially prevent rotation of the fastener head relative to the fastening surface. Thus, the shear resistance of the hardened projections within the indentations provides an effective counter-torque force within the fastening itself during tightening of the fastening.

In some applications, the method further includes threadably loosening the fastening while the plurality of hardened projections substantially prevent rotation of the adjacent fastener surface relative to the fixed fastening surface.

In some cases, the hardened projections comprise hardened spheres, e.g., such as ball bearing balls, circumferentially spaced around the washer body.

In some cases, the hardened projects are not spherical, but can be tapered or even multi-faceted.

Advantageously, the washer does not undergo galling from turning and can be reused with minimal or no wear on the washer. The washer will generally only be subject to compressive forces which normally would not damage the hard round washer or the hardened balls.

In some cases, the washer has a hardness of about 38-42 Rockwell C and the projections have a hardness of about 55-65 Rockwell C. In a particular case, the washer body has a hardness of 40 Rockwell C and a projection of about 65 Rockwell C. The hard round washer distributes the load of the fastener head and resists crush. As the fastener is tightened, the projections apply a point load and indent into the adjacent surfaces, after which the full load is spread across the washer. In a particular application, the projections are fully indented and the washer is in full face contact with adjacent fastener and fastening surfaces at a load of around twenty percent of the yield strength of the fastener. The washer body preferably securely retains the hardened balls against rotation or dislodging during repeated use.

In a particular example, hardened balls of 0.125-0.3125 inch (0.318-0.794 cm) diameter are press-fitted into the washer with about 3-4 thousandths of an inch (0.076-0.102 mm) interference fit. The projection portion of the hardened balls extend about 8-12 thousandths of an inch (0.203-0.305 mm) from the washer sides to indent the fastener head and fastening joint surface. In various implementations, the size of the hardened balls can be selected as a function of at least the washer thickness, fastener size and anticipated torque.

In some cases the apertures for receiving the hardened balls are formed by punching in a progressive die along with formation of the central through-hole. Alternatively, the apertures can be post formed. The apertures can optionally be reamed to a desired size to interferingly receive the selected hardened balls. It is advantageous for cost and manufacturability that the counter-torque washer can be assembled from readily available hard round washers and ball bearing balls.

In alternative applications, the counter-torque washer is placed between a nut and a fastened component such that the balls indent either one or both of the nut face and the fastened component. Thus, the counter-torque washer can be installed adjacent either of the threaded fastener head and the nut, depending or which is to be driven and which is to resist rotation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The present invention may be better understood, and its numerous objects, features, and advantages made apparent to those skilled in the art by referencing the accompanying drawings.

Like reference symbols in the various drawings indicate like elements.

The use of the same reference symbols in different drawings indicates similar or identical items.

DESCRIPTION OF THE PREFERRED EMBODIMENT(S)

Figure 1:
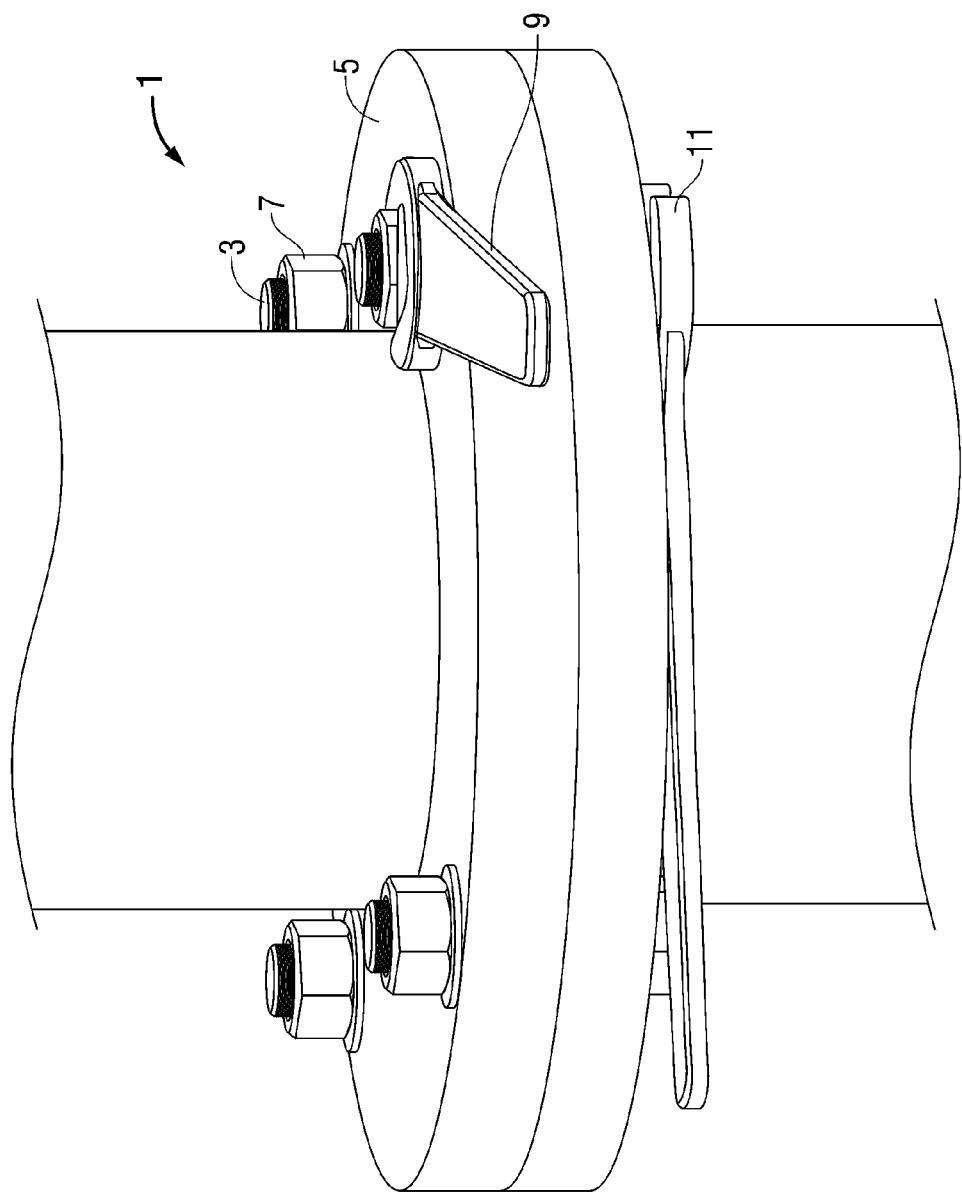
FIG. 1 is a perspective view of a conventional nut and bolt flange fastening formed using a counter-torque wrench.
Figure 2:
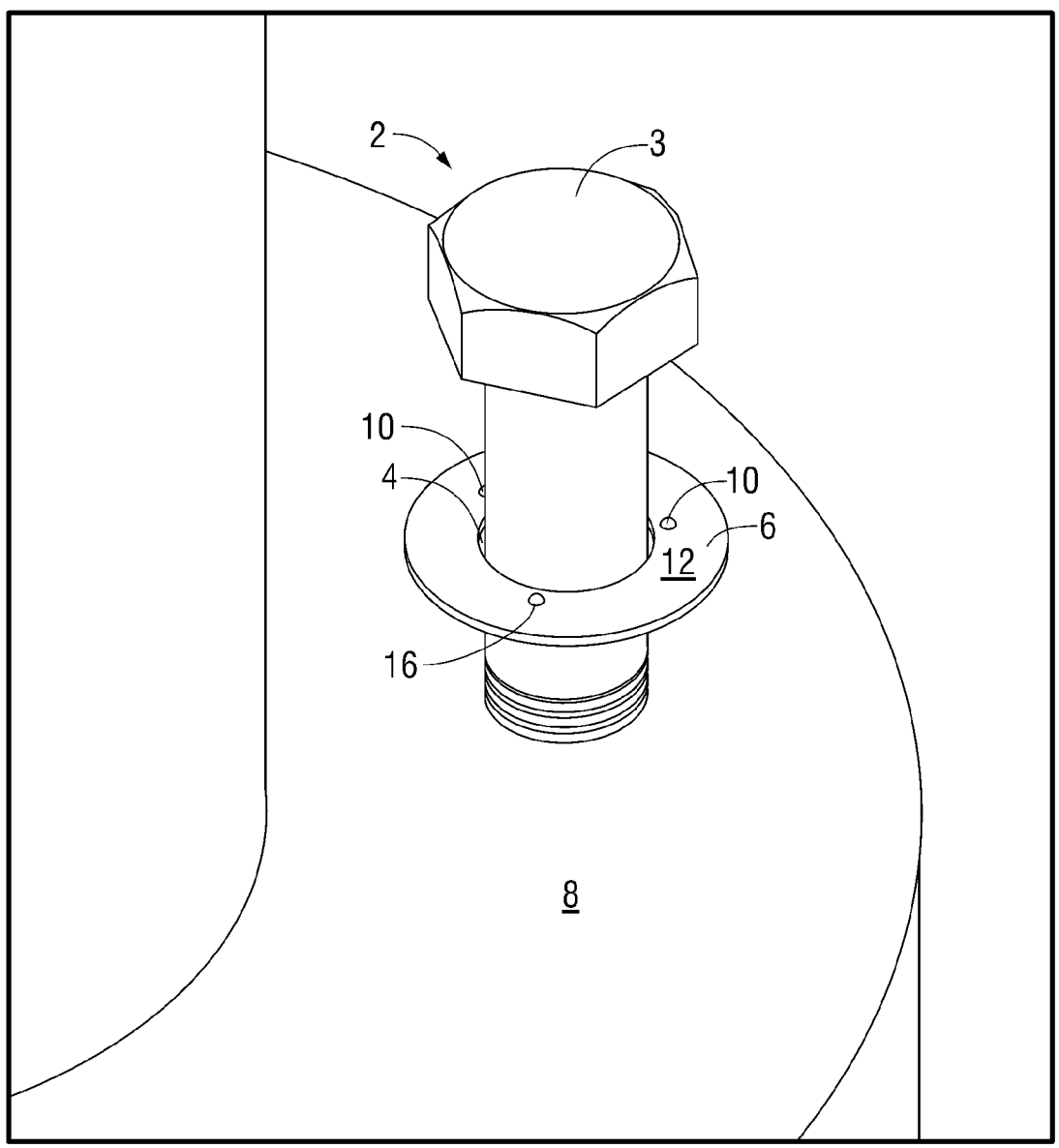
FIG. 2 is a perspective view of a partially assembled fastening including a threaded fastener and counter-torque washer bearing hardened projections.

With reference to FIG. 2, a fastening 2 includes threaded fastener 3 positioned in a through-hole 4 defined in a washer or "washer body" 6 and through a hole in a fixed fastening surface 8, such as a pipeline flange. Washer body 6 includes a plurality of apertures 16 spaced around a first broad surface 12 of washer body 6 and a plurality of hardened projections 10 seated respectively in apertures 16.

Figure 3:
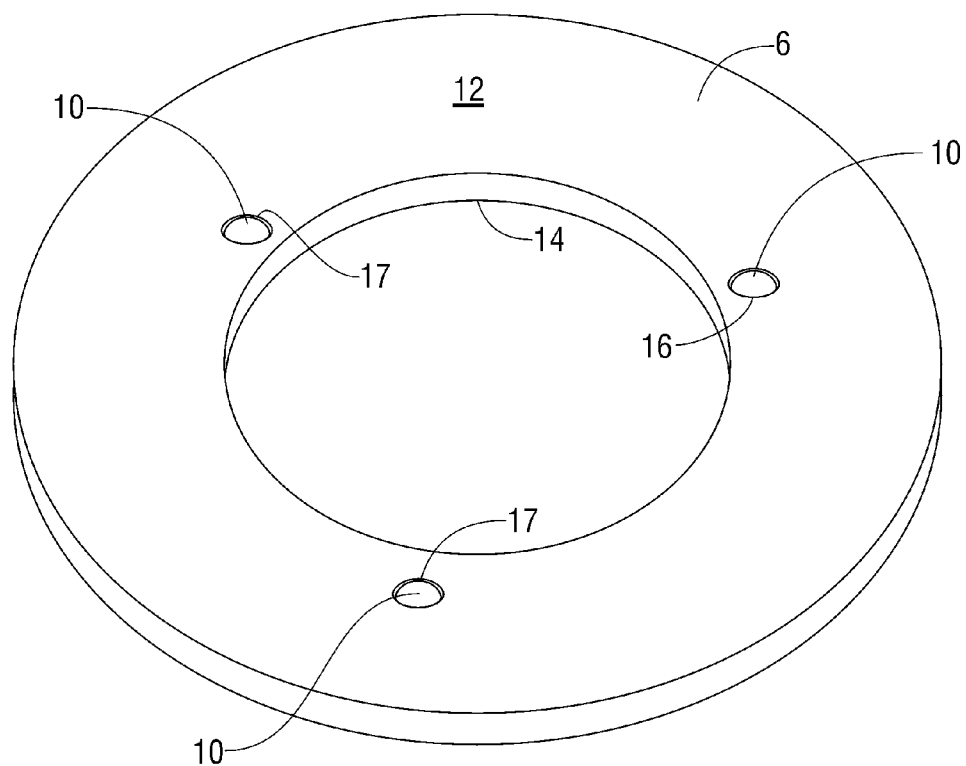
FIG. 3 is a perspective view of the counter-torque washer of FIG. 2 with hardened projections.
Figure 4:
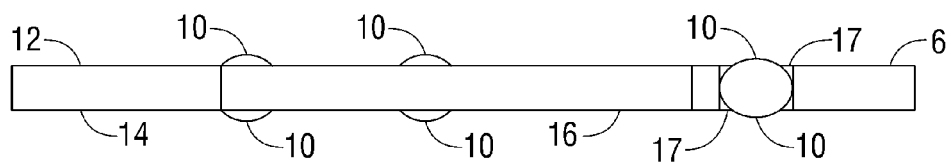
FIG. 4 is a side view of the washer of FIG. 3 showing the hardened projections extending beyond the surface of the counter-torque washer and annular displacement reservoirs adjacent the balls.

With reference to FIGS. 3-4, projections 10 comprise a portion of hardened spheres or balls seated in apertures 16 and extending beyond the first broad surface 12 of the washer body 6. The hardened spheres can be pressed into or otherwise secured in apertures 16 to secure projections 10 against rotation. Securing projections 10 within washer body 6 prevents projections 10 from merely rotating within apertures 16 during rotation of an adjacent surface, e.g., during tightening of the fastener.

Any number of projections 10 can be provided on washer body 6. It may be advantageous to have three or more recesses 16 and corresponding projections 10 equally circumferentially spaced to provide stable multi-point contact and to prevent possible binding of the fastening. Projections 10 are radially positioned to locate them under the head of fastener 3 or, alternatively, in contact with the face of a nut. Thus, washer 6 may be used adjacent either of a fastener head or nut face with projections 10 positioned to contact the respective fastener and fixed fastening surfaces.

In some implementations, apertures 16 are through-holes and the hardened spheres are sized such that projections 10 extend beyond both opposite broadest sides 12 and 14 of washer body 6. In a particular implementation, projections 10 extend 8-12 thousandths of an inch (0.203-0.305 mm) above surface 12 to provide sufficient resistance upon indentation to substantially prevent rotation of the adjacent fastener surface. The head of fastener 3 contacts washer body 6 after indentation of projections 10 into fastener 3, e.g., at 15-20 percent of the bolt load or yield strength preload. Any number or size of balls may be used in a particular application. For example, larger fastenings can include more or larger projections to achieve a desired degree of resistance.

An annular space around the ball in aperture 16 serves as a reservoir 17 or relief volume to accommodate the material displaced during indentation. This allows the washer body 6 to remain flat with the fastener head and the fastening joint surface 8. A ball is an advantageous shape to provide a point load for ready indentation and to provide a reservoir 17 for material displaced by the indentation. This point loading readily provides indentation and counter-torque benefits even at minimal loading. Accommodating displaced material is important to ensure face to face contact between washer 6 and adjacent fastener and fastening surfaces.

In some implementations, projections 10 are ball bearing type hardened steel spheres. In other implementations, steel pins or tapered cylinders can be used to form projections 10. In some implementations, projections 10 can include ceramic materials, sintered materials, welded materials, induction hardened materials or other hardened materials. It is generally advantageous that projections 10 are sufficiently hardened to indent adjacent surfaces in most industrial fastenings. In some implementations, projections 10 are at least as hard as the surface of those fasteners designated "hardened fasteners" in the art, e.g., greater than 40 Rockwell C.

With reference to FIG. 4, washer body 6 is shown with projections 10 protruding from both of the broadest surfaces 12 and 14 (top and bottom) of washer body 6. The balls forming projections 10 extend from one surface 12 through washer body 6 to the second surface 14. In some cases, the hardened spheres or balls are pressed into apertures 16 formed in washer body 6. In some implementations, projections 10 extend about 8-12 thousandths of an inch (0.203-0.305 mm) above surface 12 of washer body 6. In some implementations, apertures 16 are sized 3-4 thousandths of an inch (0.076-0.102 mm) under to provide sufficient interference fit to substantially prevent the balls forming projections 10 from rotating within apertures 16 during tightening of fastening 2. In some implementations e.g., with particularly thick washer bodies, hardened spheres may be independently secured in recesses in each of surfaces 12 and 14 of washer body 6 to extend beyond only the respective surface 12 or 14.

Figure 5:
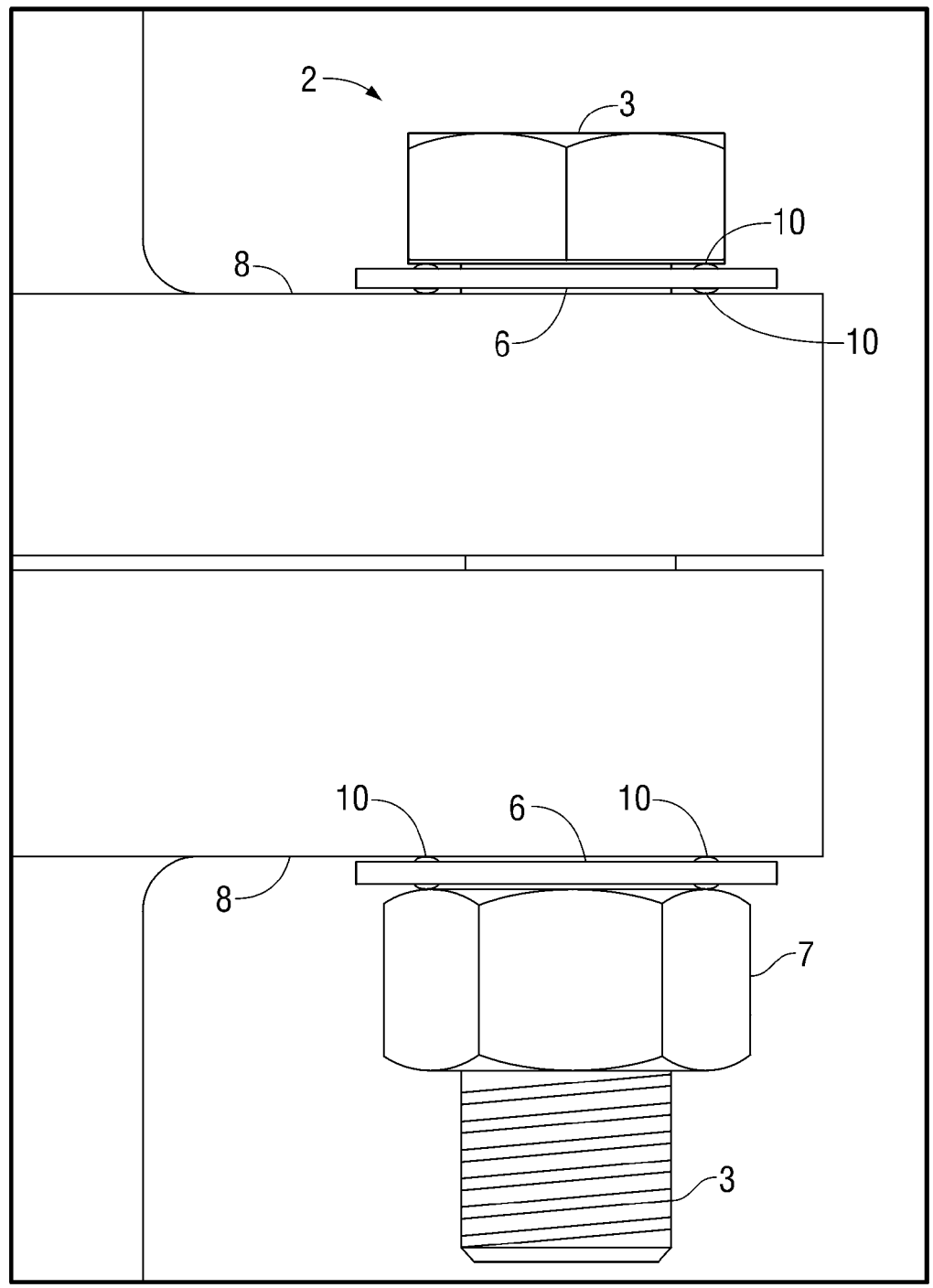
FIG. 5 is a side view of a fastening showing the counter-torque washer of FIGS. 3-4 usable adjacent either of the fastener head of the nut in the fastening.
Figure 6:
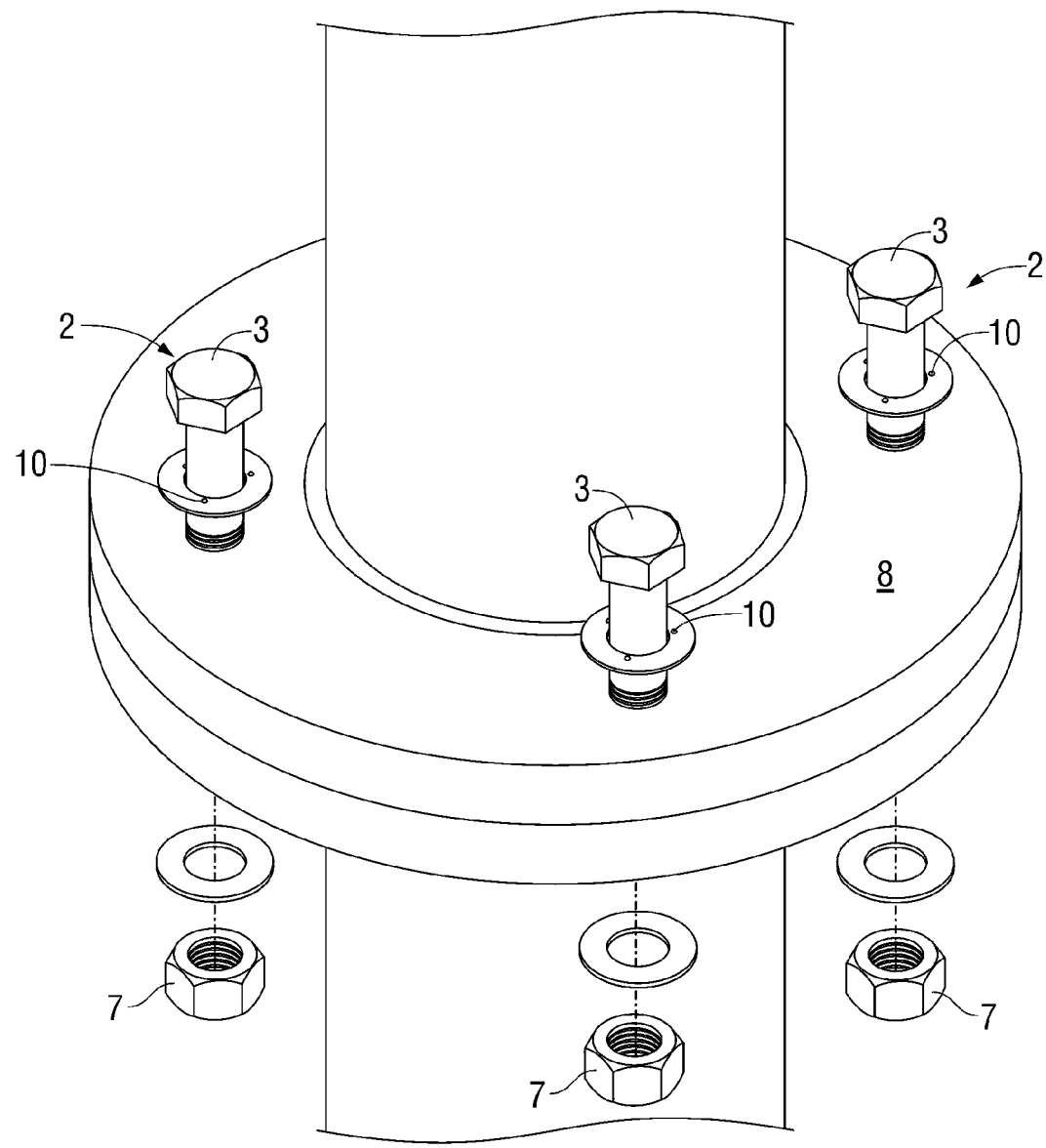
FIG. 6 is a perspective view of multiple flange fastenings including a counter-torque washer with hardened projections.

With reference to FIGS. 5-6, a fastening 2 includes a threaded fastener 3, fixed fastening joint surfaces 8, nut 7 and washer body 6. Projections 10 indent the underside of the head of the threaded fastener 3 as nut 7 is tightened. Conversely, as shown in FIG. 5, washer body 6 may alternatively be positioned adjacent the face of nut 7 to resist rotation of nut 7 during rotation of fastener 3. Thus, the counter-torque washer may be used adjacent either of fastener 3 or nut 7. Preferably, washer body 6 is provided with projections 10 on both broadest surfaces such that projections 10 indent both the underside of the fastener head or nut face and the fixed fastening joint surface 8.

Advantageously, projections 10, upon indenting the adjacent fastener surface, substantially prevent rotation of the respective fastener 3 or nut 7 relative to the fixed fastening surface 8 during rotation of the other of fastener 3 and nut 7. Significantly, projections 10 can prevent rotation during both tightening and loosening of fastening 2. This is particularly advantageous when access to the washer body retained portion of the fastening is less accessible.

For example, in the context of an elevated wind turbine, installation and maintenance of the various flange fasteners on the turbine support sections require a mechanic to operate heavy tools at significant heights. By providing a counter-torque force within fastening 2 with washer body 6 bearing projections 10, the mechanic can use both hands to operate a fastener driver from one side without the need for another mechanic to hold a counter-torque wrench on the other side.

Figure 7:
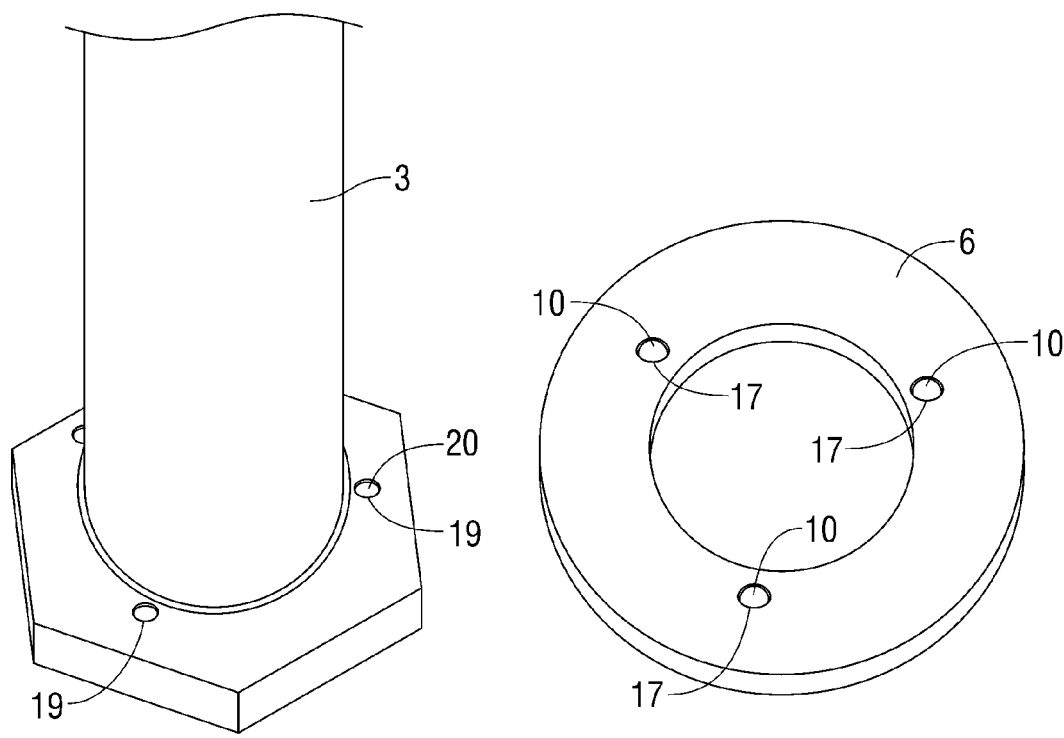
FIG. 7 illustrates a fastener having indentations formed by the hardened projections on the washer and displaced material adjacent the indentation receivable in a relief volume adjacent the hardened projections.

With reference to FIG. 7, washer body 6 with projections 10 is depicted adjacent threaded fastener 3 following indentation of the underside of the fastener head from tightening of fastening 2. Ridges 19 of displaced material are formed around indentations 20 on the fastener surface. Reservoirs 17 adjacent projections 10 accommodate the displaced material forming ridges 19 to allow the washer to remain in full-faced contact with the fastener head and a fastening joint surface to fully spread the applied load. Reservoir 17 is preferably at least equal to a volume of a portion of the respective projection 10 that extends beyond the broad side of the washer body 6. While the space needs not be annular, such a configuration can provide for receipt of displaced material in multiple radial directions. Sufficiency of relief volume of reservoir 17 ensures that displaced material from indenting does not encroach beyond the annular space or prevent the broad side of the washer from fully engaging a respective fastening surface.

As shown, it is advantageous for projections 10 to be radially positioned to contact the bearing surface of the underside of the fastener head. As will be appreciated, Brinell hardness values can be used to determine the size of ball or other projection 10 needed to achieve a desired degree of indentation in a fastener or surface of a known hardness.

A number of embodiments of the invention have been described. Nevertheless, it will be understood that various modifications may be made without departing from the spirit and scope of the invention. For example, while various implementations have been described with reference to a plurality of projections extending from a plurality of apertures, it will be appreciated that any number of projections, including a single projection, can be used. Similarly, washer body can be u-shaped or slotted and can be sized and constructed with varied perimeter dimensions for near wall fastenings or other installation types. Any number of known washer configurations can be used in various implementations. Accordingly, other embodiments are within the scope of the following claims.

What is claimed is:

1. A counter-torque washer comprising a washer body having two oppositely-directed broad sides and defining a central aperture therethrough for receiving a threaded fastener;

multiple hardened balls retained against rotation within respective apertures through the washer body, each of the balls sized such that it extends beyond both of the oppositely-directed broad sides of the washer body to engage adjacent surfaces between which the counter-torque washer is compressed during tightening of a threaded fastener disposed within the central aperture; and an empty volume of the aperture around at least one of the balls defining a relief volume to receive material displaced by the at least one of the balls during indentation.

2. The washer of claim 1, wherein the projections are of a hardness that is greater than a hardness of the adjacent surfaces in a fastening to be formed.

3. The washer of claim 2, wherein the projections are hardened ball bearing balls.

4. The washer of claim 1, wherein the washer body is a hard round washer.

5. A counter-torque washer comprising:

a washer body having two broadest sides and defining a through-hole for receiving a threaded fastener and the two broadest sides defining a plurality of apertures;

a plurality of projections each seated in as respective one of the apertures and sized to extend beyond the surface of the respective broadest sides to indent a respective one of an underside of a head of the threaded fastener and an adjacent joint surface against which the washer is compressed during loading of the threaded fastener; and an empty volume of at least one of the apertures defining a reservoir to receive material displaced by at least one of the projections during indentation.

6. The washer of claim 5, wherein the projections are portions of hardened spheres.

7. The washer of claim 5, wherein the projections are substantially hemispherical.

8. The washer of claim 5, comprising at least three projections substantially equally circumferentially spaced on the washer body.

9. The washer of claim 5, wherein the threaded fastener is a threaded rod and the head of the threaded fastener is a nut threaded thereon.

10. The washer of claim 5, wherein the washer body has a hardness of about 38-42 Rockwell C and the projections have a hardness of about 55-65 Rockwell C.

11. The washer of claim 5, wherein the projections are configured to provide a point load to indent an adjacent surface in a fastening to provide a counter-torque force upon initiation of loading of the fastener.

12. A method of securing a component with a threaded fastener, the method comprising:

placing a threaded fastener through an aperture of the component to be secured and into a threaded nut, the threaded fastener having a head and a shaft extending from the head through the counter-torque washer of either of claims 1 or 5; and tightening the threaded nut such that both the head of the threaded fastener and the component bear against the hardened balls of the counter-torque washer with sufficient load that the hardened balls indent either one or both of the threaded fastener head and the component;

wherein an empty volume of at least one of the apertures receives material displaced by at least one of the hardened balls during tightening.

13. A method of forming a fastening comprising:

providing a washer body between a threaded fastener and a nut configured to threadably engage the threaded fastener; the washer body defining a through-hole far receiving the threaded fastener and having two broadest sides, the broadest sides bearing a plurality of hardened projections seated in respective apertures harmed in the broadest sides;

positioning the washer body adjacent one of the nut and a head of the threaded fastener;

rotating the other of the nut and the head of threaded fastener to tighten the fastening;

during the rotating, indenting with the hardened projections an adjacent fixed joint surface and a respective surface of one of the nut and the fastener head to substantially prevent rotation of the one of the nut and the fastener head relative to the fixed joint surface; and during the indenting, receiving material displaced by at least one of the hardened projections within a relief volume defined by the washer body adjacent the respective projection.

14. The method of claim 13, wherein the hardened projections comprise hardened spheres circumferentially spaced around the washer body.

15. The method of claim 13, further comprising threadably loosening the fastening while the plurality of hardened projections substantially prevent rotation of the fastener head.

16. The method of claim 13, further comprising bringing the washer body into contact with at least one of the adjacent fixed joint surface and a respective surface of one of the nut and the fastener head with the projections indented therein.

17. The method of claim 13, further comprising loosing the fastening while the projections substantially prevent rotation of a respective surface of one of the nut and the fastener head relative to an adjacent fixed joint surface.

* * * * *